United States Patent
Cofta et al.

(10) Patent No.: US 7,162,525 B2
(45) Date of Patent: Jan. 9, 2007

(54) METHOD AND SYSTEM FOR VISUALIZING A LEVEL OF TRUST OF NETWORK COMMUNICATION OPERATIONS AND CONNECTION OF SERVERS

(75) Inventors: Piotr Cofta, Helsinki (FI); Lauri Paatero, Helsinki (FI)

(73) Assignee: Nokia Corporation, Espoo (FI)

( * ) Notice: Subject to any disclaimer, the term of this patent is extended or adjusted under 35 U.S.C. 154(b) by 591 days.

(21) Appl. No.: 09/922,672

(22) Filed: Aug. 7, 2001

(65) Prior Publication Data

US 2003/0030680 A1    Feb. 13, 2003

(51) Int. Cl.
G06F 13/00    (2006.01)
(52) U.S. Cl. .................. 709/228; 709/219; 709/225; 719/329
(58) Field of Classification Search ................ 709/217, 709/219, 223, 225, 227, 228, 230, 250; 719/313, 719/329; 713/155, 156, 175, 176, 201
See application file for complete search history.

(56) References Cited

U.S. PATENT DOCUMENTS

| | | | |
|---|---|---|---|
| 5,240,961 A | 8/1993 | Shug | 514/556 |
| 5,935,248 A * | 8/1999 | Kuroda | 713/201 |
| 5,953,528 A | 9/1999 | Sullivan | |
| 5,958,051 A | 9/1999 | Renaud et al. | |
| 6,029,245 A | 2/2000 | Scanlan | |
| 6,212,636 B1 * | 4/2001 | Boyle et al. | 713/168 |
| 6,366,912 B1 * | 4/2002 | Wallent et al. | 707/9 |
| 6,697,944 B1 * | 2/2004 | Jones et al. | 713/168 |
| 6,745,367 B1 * | 6/2004 | Bates et al. | 715/500 |
| 6,766,458 B1 * | 7/2004 | Harris et al. | 713/201 |
| 6,775,536 B1 * | 8/2004 | Geiger et al. | 455/411 |
| 6,854,016 B1 * | 2/2005 | Kraenzel et al. | 709/229 |
| 6,901,251 B1 * | 5/2005 | Kiessling et al. | 455/410 |
| 2002/0172367 A1 * | 11/2002 | Mulder et al. | 380/277 |
| 2003/0014629 A1 * | 1/2003 | Zuccherato | 713/156 |
| 2003/0208454 A1 * | 11/2003 | Rienhoff et al. | 707/1 |

FOREIGN PATENT DOCUMENTS

| | | |
|---|---|---|
| EP | 0945864 | 9/1999 |
| SE | 9604464 | 6/1998 |
| WO | 9961990 | 12/1999 |

* cited by examiner

Primary Examiner—Viet D. Vu
(74) Attorney, Agent, or Firm—Banner & Witcoff, Ltd.

(57) ABSTRACT

The invention is a method and system for visualizing a level of trust of network communication operations and connection of servers. In a system comprising a terminal, including a display and a network, the terminal using a browser to communicate with a network during a terminal session comprising at least communication operation initiated by a user and transmitted to the network, a method of the invention includes initiating a terminal session with the browser by making a transmission to the network; the network, in response to initiation of the terminal session, provides information from the network to the browser relating to the terminal session; and displaying on the display a level of trust based upon a standard of comparison of the at least one communication operation prior to transmission to the network informing the user of a level of security determined to be associated with the at least one communication operation if the at least one communication operation is permitted by the user to be transmitted to the network.

24 Claims, 9 Drawing Sheets

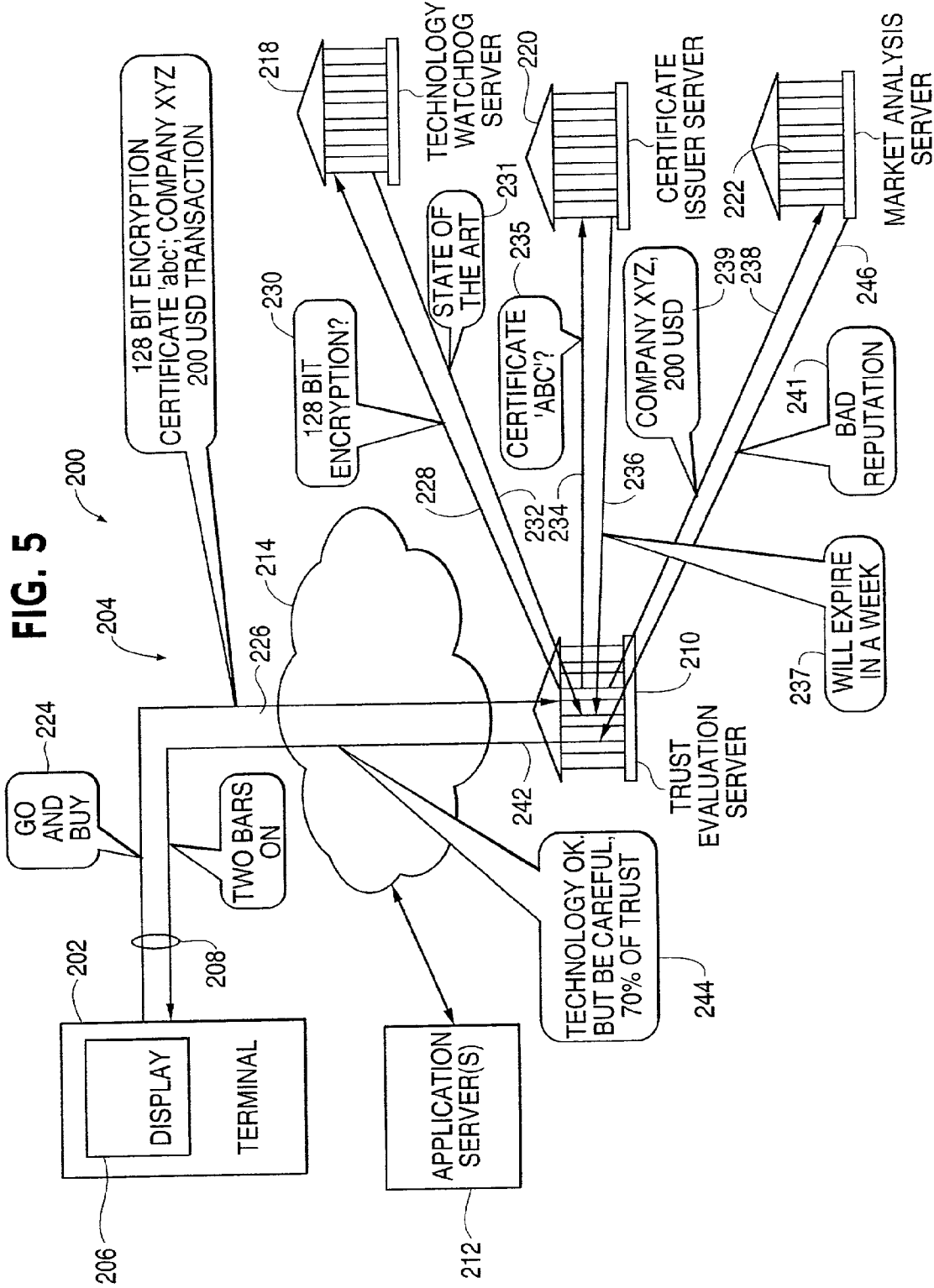

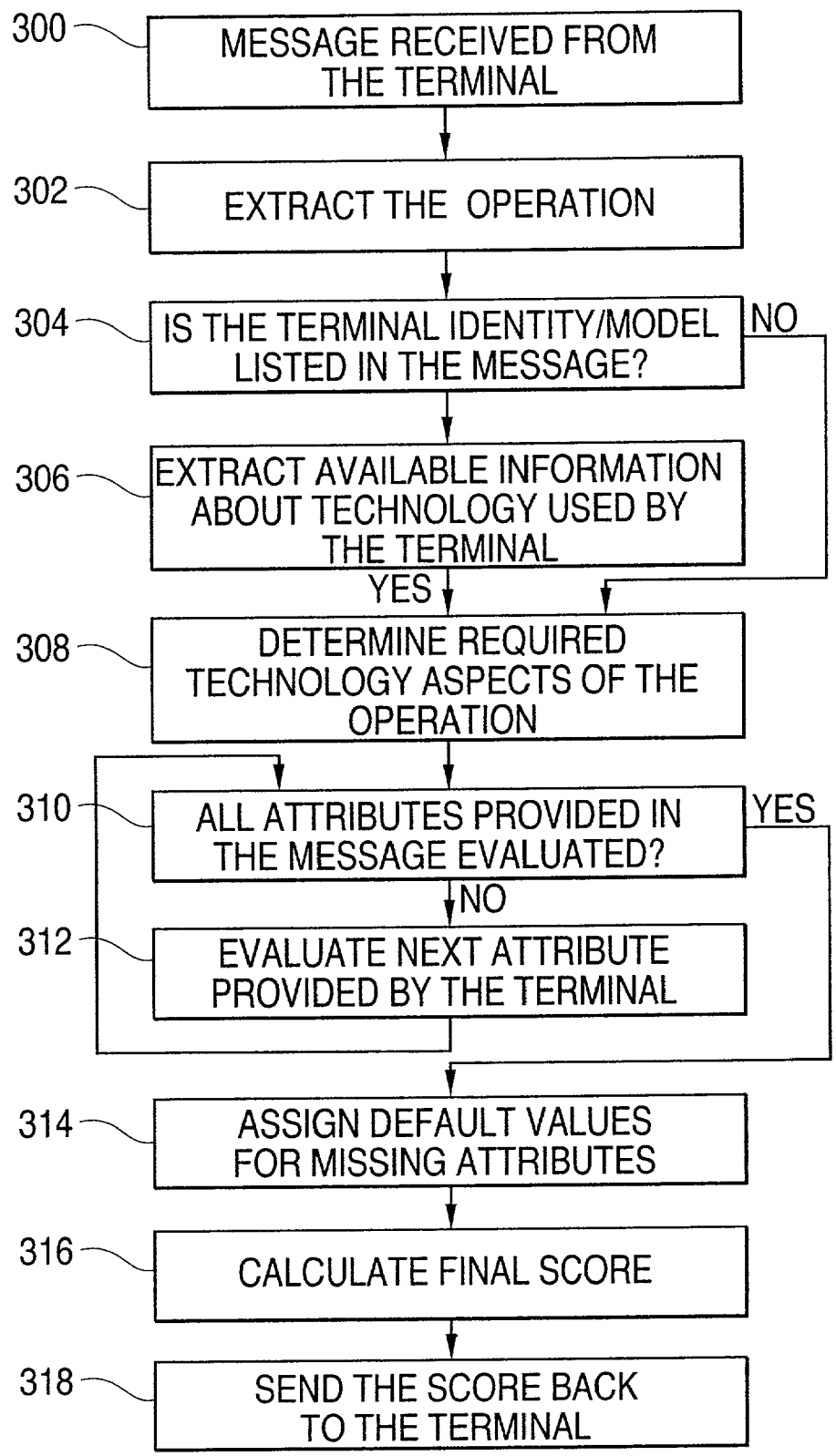

METHOD AND SYSTEM FOR VISUALIZING A LEVEL OF TRUST OF NETWORK COMMUNICATION OPERATIONS AND CONNECTION OF SERVERS

BACKGROUND OF THE INVENTION

1. Field of the Invention

The present invention relates to a system and method permitting a user of a terminal to visualize a level of trust of network communications and connections to servers.

2. Description of the Prior Art

FIG. 1 shows a prior art mobile terminal 1 of the Assignee used for cellular telecommunications, which communicates via a wireless telecommunication network, e.g. a cellular network.

The keypad 2 has a first group of twelve keys 7, e.g. alphanumeric keys, by means of which the user can enter a telephone number, write a test message using Short Message Service (SMS), write a name (associated with the phone number), etc. Each of the twelve alphanumeric keys 7 is provided with identifying numerals "0–9" or a sign "#" or "*", respectively. In alpha mode, each key is associated with a number of letters and special signs are used in text editing.

The keypad 2 additionally comprises a second group of keys which are two soft keys 8, two call handling keys 9, and a navigation key 10. The two soft keys 8 operate in conjunction with the liquid crystal display 3 to display text which varies dependent upon the mode of operation and provides the user with the ability to select different programmed modes of operation provided by programming resident in the memory 17. Soft keys are not limited to the selection of a single dedicated terminal function. The illustrated soft keys 8 may have a functionality corresponding to the Assignee's models 2110™ and 8110™. At least one of the soft keys is defined as an operation key 8a having multiple functionality for handling access to a menu structure. The functionality of the operation key 8a depends on the present state of the mobile terminal. The operation key 8a is arranged to perform a group of predetermined actions associated with a state. The default function or the present function of the operation key 8a can be displayed in a predetermined area 21 of the display 3.

The scroll key 10, which can also be called a navigation key, is an up/down key and is placed centrally on the front surface of the mobile terminal between the display 3 and the group of alphanumeric keys 7. The user controls the scroll key 10 by simply pressing the up/down key using his/her thumb which allows the user to scroll between a group of items in a menu provided in the user interface. Since many experienced users are used to one-hand control, it is a very good solution to place an input key, requiring precise motor movements. Thus, the user may place the mobile terminal in the hand between the finger tips and the palm of the hand. The thumb is thereby free for inputting information. The scroll key 10 can be a roller key (not shown), which is arranged to rotate in one or several directions. The roller key allows the user to roll the key to scroll between different items in a menu. The roller key 10 may be in accordance with the Assignee's U.S. patent application Ser. No. 08/923,696, now U.S. Pat. No. 5,911,945, which is incorporated herein by reference in its entirety.

Further, the scroll key 10 allows the user to scroll selectively between a group of items in a menu. This means that the user can select an item preceding or succeeding the item in the menu loop of the phone, while he/she can access a sub-menu loop under the item concerned in the menu loop by activation of the operation key 8a.

In some states, such as entering a phone number on the alphanumeric keypad 7, the other soft key 8b can be defined as a clear key, which may be used for erasing the last entered digit or letter by brief depression on the clear key 8b. If the clear key 8b is depressed for a longer duration, the entire number or word is erased.

Although the functions of the mobile terminal 10 may be controlled by the operational key 8a, it sometimes can be expedient to use two or more operational soft keys in the second group of keys, which can be integrated into a touch-sensitive display (not shown) in a manner analogous to a screen of a personal digital assistant (PDA).

The two call handling keys 9 are used for establishing a call or a conference call, terminating a call or rejecting an incoming call.

FIG. 2 schematically shows a block diagram of major parts of the mobile terminal 1 of FIG. 1. These parts are conventional and are typically used in mobile terminals such as those in which the present invention may be practiced. The microphone 6 records the user's speech, and analog signals formed thereby are A/D converted in an A/D converter (not shown) before the speech is encoded in an audio part 14. The encoded speech signal is transferred to a controller which is a programmed microprocessor 18 that executes programming to control the mobile terminal 1 of FIG. 1. The processor 18 may execute diverse types of software to provide a wide variety of terminal functions during an active mode which are well known. The processor 18 also forms the interface to peripheral units, comprising a LCD driver 13 which drives the LCD display 3 of FIG. 1 to provide graphical displays to the user, RAM memory 17a and a Flash ROM memory 17b, a SIM card 16, and the keyboard 2 in the form, for example without limitation, of a keypad (as well as data, power supply, etc.). The processor 18 communicates with a transmitter/receiver 19, which sends/receives a request/response to/from one or several telecommunication networks. The audio part 14 speech-decodes the signal, which is transferred from the processor 18 to the speaker 5, via a D/A converter (not shown).

Internet users use worldwide web (WWW) browsers to access information services on WWW servers. WWW browsers are programs running in a user's computer. The user's computer may be mobile and connected to the internet via a wireless link or fixed and connected to the internet via a wire line connection. A WWW server provides pages to a WWW browser. The WWW server stores or generates information shown in pages and transmits the information to the WWW browser using an internet connection or session.

A WWW server may have a certificate issued by a trusted third party (TTP) also known as Certificate Agency (CA) which, along with a secret key, provides the identity of the server to the client user of the fixed or mobile terminal. The certificate contains the verified name of the server or organization responsible for the server.

WWW pages may be divided into frames generated by different servers. The frames from different servers are combined into an integrated page which is displayed on a user terminal under control of the WWW browser.

It is important to prevent a WWW server from impersonating a true WWW server. Any impersonation could allow the impersonating server to gain, secret, confidential or commercially sensitive information. Currently, browsers do not permit the identity of a server providing pages containing frames integrated together from different servers to be indicated to a user in a practical and easy way.

Currently, the identity of the server is not shown to the users in a WWW browser through the user interface (UI). It is possible in some circumstances to find out the identity of the server through commands through the UI interface of the browser. Most users of a browser do not check the identity of the server to which the browser is connected because such identity checking is not easy and furthermore many users do not even realize the potential problem.

When a WWW page contains several frames only the first frame's status can be seen in current browsers. This makes it impossible to check the identity of the servers providing frames which are integrated into a page using a browser.

FIG. 3A shows a generic log in page of a WWW browser displaying a single frame 100. The information content of the frame 100 is not important. The indicator 102 in the bottom of the frame, which is a lock or otherwise such as that used by the Netscape Navigator™ is used to visually inform the user if the connection is considered secured. As illustrated, the lock is closed which indicates that for the single page 100 the unidentified source server is indicated as being secure. However, to find out the true identity of the server providing the single frame 100, it is necessary to click on the indicator 102 to further have the certificate of the server providing the frame 100 shown on the display 104.

FIG. 3B illustrates a log-in page 105 which is split into two frames 106 and 108 which are provided from different servers. The content thereof not being important. Frames 106 and 108 are provided by different servers. The lock indicator 102, as a result of being unlocked, indicates only that the left-hand frame 106 is from a non-secure server. However, the indicator 102 does not convey any information regarding the right-hand frame 108. However, if the frame 108 contains information which is, secret, confidential or business sensitive, it is critical for the user of the browser to be advised of the identity of the server 108 as being one which has a recognized identity to the user and is secure in order to provide the user with a reasonable degree of security about the server to which the user may supply secret, confidential or business sensitive information. However, no information about the server providing the frame 108 is available leaving the user in the quandary of proceeding with communications through the internet involving secret, confidential or business sensitive information which is being directed to a server of unknown authenticity.

The security indicator 102 of the prior art does not provide, even when security is indicated, that a mail session is secure which can mislead the user about the correctness of security and does not provide the user information about the actual level of security or about the credibility of the sources of the frames. The security indicator 102 of the prior art may indicate either a weak security with no authentication which is subject to being compromised and or a strong security with authentication. The possible different interpretations of the indicator 102 makes the indicator of little value to a concerned user.

SUMMARY OF THE INVENTION

The present invention is a system and method which (1) enables a user of the terminal which may be mobile or fixed, which is coupled to a network such as, but not limited to the internet, to determine for at least one communication operation and preferable all communication operations associated with a terminal session through a display on the display of the terminal a level of trust of the communication operation (s) relative to a standard prior to transmission thereof to the network informing the user of a level of security determined to be associated with the communication operation(s) permitted by the user to be transmitted to the network, and (2) when the display on the terminal contains multiple frames, that the source of all of the frames, which may be from multiple application servers, is certified to the user as being a secure source on which the user may rely to transmit secret, confidential or business information thereto without concern for the security thereof.

The display of a level of trust on the terminal device, which may be mobile or fixed and connected to the network via either wireline or wireless connectivity, informs the user of a relative level of security determined to be associated with each communication operation of a terminal session to thereby enable the user to choose whether to continue with the communication operations of the session based upon the displayed level of trust. The determination of the level of trust may be determined (1) solely at the mobile terminal through information stored in the mobile terminal at the time of manufacture or downloaded thereafter thereto, (2) solely from at least one server in a network to which the communication operations will be transmitted prior to the actual transmission thereof to the network to obtain a level of trust evaluation thereof, or (3) through a sharing of the determination of the level of trust between at least one network server and a processor in the terminal. The present invention may be practiced with equal facility regardless of where in the system the level of trust is determined.

A number of factors may be utilized in determining the level of trust which is displayed. A first attribute of the level of trust determination is dependent upon the technology utilized during the communication operation between the terminal and the network. The technological component is dynamic in nature in that with the passage of time, technologies which may be initially highly secure and have a high level of security associated therewith may, because the advent of newer technologies, become relative to the state of the art less secure. The resulting level of trust in this situation should be downgraded even though the same technology is being continually used. For example, without limitation, the technological component may pertain to (1) encryption utilized during the transmission of the communication operations between the terminal and various entities in the network, (2) how the session is initiated, (3) how storage in the terminal is accomplished, and (4) how the identification of the user is made by the user of the terminal.

Additionally, beyond the aforesaid technological attributes of the terminal and the network, non-technological attributes may be utilized to determine the level of trust, such as, but without limitation, the reliability of the operator of the application server to which the terminal is connected during the session and the commercial viability of any commercial offering made by the operator of the application server or otherwise of a source of the purchased goods or services, etc.

The display of the level of trust by the terminal may be without limitation numerical or graphical. Regardless of the type of display, the display is relative to a standard of reference such that a larger numerical quantity displayed represents a greater level of trust or a greater graphical representation, such as without limitation, a number of bars from zero to four with four being the greatest provides the user with sufficient information in order for the user to make an intelligent choice of whether to authorize the communication operation to be made with the network. While the ultimate choice of continuing with a session containing multiple communication operations dependent upon the display of the level of trust is the user's choice, the present invention's display of the relative level of trust enables intelligent choices to be made by the user of whether to transmit in a communication operation secret, confidential, or business information to the network.

Numerous different weighting factors may be associated with the technological and non-technological attributes used to determine the level of trust. The present invention is not limited to any particular choice of attributes used for determining the level of trust both from the technological and non-technological perspective. Furthermore, as stated above, the present invention facilitates a current assessment of the level of trust to be made dependent upon change in the technological and non-technological attributes over time so as to give the user of the terminal during any current session the most up to date information involving the level of trust.

The level of trust may be calculated using a numerically based algorithm which sums different components of the attributes which are weighed to determine the overall score representing a communication operation which is being evaluated prior to transmission to the network. A numerically-based algorithm may be easily updated to reflect change in the contribution of various attributes which provide numerical components of the possible perfect score.

Furthermore, the invention provides display of a single page containing frames from multiple servers with an indicator of whether the frames are certified as being transmitted from servers which are secure. A certification or other indication is displayed by the terminal to inform the user of whether each page containing multiple frames comes from the verified server with each frame coming from a secure source.

In a system comprising a terminal, including a display and a network, the terminal using a browser to communicate with a network during a terminal session comprising at least one communication operations initiated by a user and transmitted to the network, a method in accordance with the invention includes initiating a terminal session with the browser by making a transmission to the network; the network, in response to initiation of the terminal session, providing information from the network to the browser relating to the terminal session; and displaying on the display a level of trust informing the user of a level of security determined to be associated with the at least one communication operation if the at least one communication operation is permitted by the user to be transmitted to the network based upon a standard of comparison of the at least one communication operation prior to transmission to the network informing the user of a level of security determined to be associated with the at least one communication operation if the at least one communication operation is permitted by the user to be transmitted to the network. The terminal may be a mobile terminal; and the at least one communication operation may comprise wireless transmissions between the mobile terminal and an entity in the network. A level of trust of each of the communication operations may be displayed; and wherein each level of trust may be based at least in part upon technology in the network which is involved with each communication operation associated with the displayed level of trust. The network may comprise a server which determines a level of trust of the at least one communication operation; and the level of trust determined by the server may be transmitted to the terminal and displayed by the display thereof. The mobile terminal may comprise a processor; and in response to each communication operation, the processor may determine a level of trust which is displayed by the display. The network may comprise a server and the terminal may comprise a processor; and the server may provide information about processing of each communication operation by the network to the processor and the processor in response to the information may determine the level of trust which is displayed by the display. The server may determine a level of trust of each communication operation based at least in part on technology of the network associated with the network providing each communication operation. The level of trust may also be at least in part dependent upon at least one additional attribute the network used in processing each communication operation. The at least one additional attribute may be at least one of reliability of an operator of a server offering a service during the session through the browser to the user (or by applying other communication means, such as e-mail or SMS) or commercial viability of an offer of service made to the user during the session through the browser or other used network connection. The display of the level of trust may be a graphic presentation or a numerical value.

A system in accordance with the invention includes a terminal including a display; a network to which the terminal is coupled via a communication link; and wherein the terminal uses a browser or e-mail or SMS to communicate with the network during a terminal session comprising communication at least one operation initiated by the user and transmitted to the network with the terminal session being initiated with the browser, e-mail, or SMS by making a transmission to the network, the network, in response to initiation of the terminal session, provides information from the network to the browser, e-mail or SMS relating to the terminal session, and the display displays a level of trust informing the user of a level of security determined to be associated with the at least one communication operation if the at least one communication operation is permitted by the user to be transmitted to the network based upon a standard of comparison of at least one communication operation prior to transmission to the network informing the user of a level of security determined to be associated with the at least one communication operation if the at least one communication operation is permitted by the user to be transmitted to the network. A level of trust of each communication operation may be displayed; and wherein each level of trust is based at least in part upon technology in the network which is involved with each communication operation associated with the displayed level of trust. The network may comprise a server which determines a level of trust of each communication operation; and the level of trust determined by the server may be transmitted to the terminal and displayed by the display thereof. The mobile terminal may comprise a processor; and in response to each communication operation, the processor may determine a level of trust which is displayed by the display. The network may comprise a server and the terminal may comprise a processor; and the server may provide information about processing of each communication operations by the network to the processor and the processor in response to the information may determine the level of trust which is displayed by the display. The server may determine a level of trust of each communication operation based at least in part on technology of the network associated with the network providing each communication operation. The level of trust may also be at least in part dependent upon at least one additional attribute the network used in processing each communication operation. The at least one additional attribute may be at least one of reliability of an operator of a server offering a service during the session through the browser, email or SMS to the user or commercial viability of an offer of service made to the user during the session through the browser. The display of the level of trust may be a graphic presentation or a numerical value.

A system in accordance with the invention comprises a terminal including a display; a network including a server to which the terminal is coupled by a telecommunications link; and wherein the server stores a certificate issued by a trusted third party, such as CA containing a verified identity of the server or an organization responsible for the server and a secret key, the secret key and the certificate, being transmitted to the terminal and processed by the terminal to determine if the identify of the server may be displayed to a user of the terminal as being from a trusted source, the display containing at least one page containing frames and a display may be displayed indicating whether the frames are certified as being from a trusted source. The system may further include at least one additional server, the at least one additional server providing at least one frame to the server; and the server may process the at least one frame from the additional server and any frame provided by the server to form an integrated page containing the frames which is transmitted to the terminal and displayed by the display. The integrated page may be displayed with the certificate of the server indicating that the integrated page is from a trusted source.

A method in a system comprising a terminal including a display, a network including a server to which the terminal is coupled by a telecommunications link in accordance with the invention including storing with the server a certificate issued by a trusted third party, such as CA, containing a verified identity of the server or an organization responsible for the server and a secret key; transmitting the certificate and the secret key to the terminal; and processing at the terminal the certificate and the key to determine if the identity of the server may be displayed to the user of the terminal as being a trusted source; and displaying with the display results of the processing. The network may comprise at least one additional server; the at least one additional server may provide at least one page to the server; and the server may process the at least one page from the additional server and any page provided by the server to form an integrated page which is transmitted to the terminal and displayed by the display. The integrated page may be displayed with the certificate of the server indicating that the integrated page is from a trusted source.

BRIEF DESCRIPTION OF THE DRAWINGS

FIG. 5 illustrates a system diagram of a system in accordance with the invention which generates a display of the level of trust used to inform the user of the security level of communication operation and that displayed pages each containing multiple frames are from secure servers.

FIG. 6 illustrates a flow chart of the processing of individual communication operations by a trust evaluation server in the system of FIG. 5.

Like reference numerals identify like parts throughout the drawings.

DESCRIPTION OF THE PREFERRED EMBODIMENTS

Figure 1:
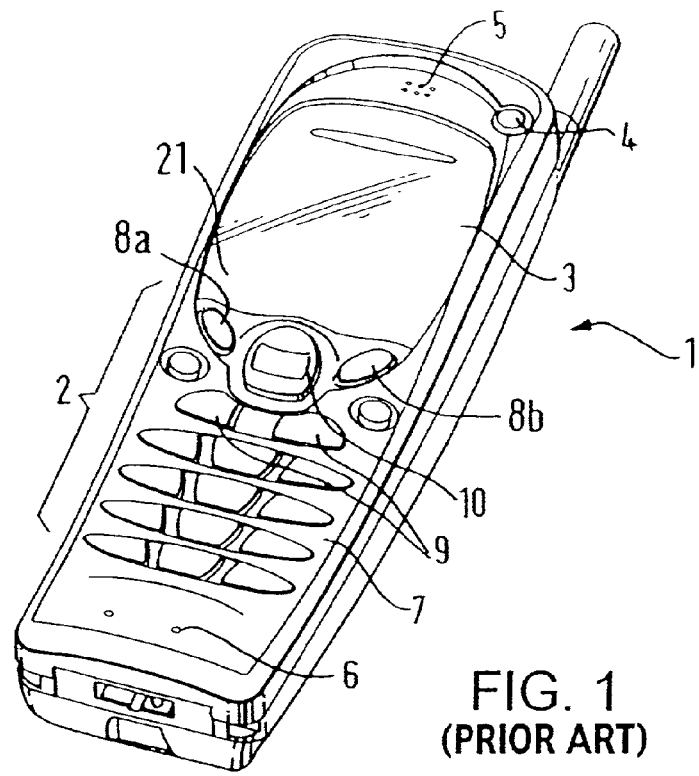
FIG. 1 illustrates a prior art mobile terminal which is one type of terminal which may be used with the practice of the present invention.
Figure 4A:
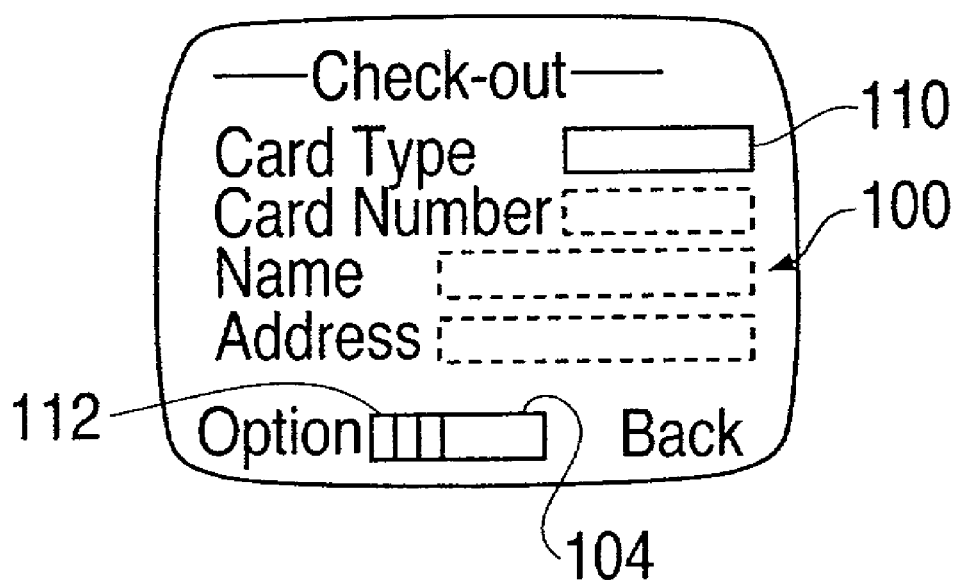
FIGS. 4A–4E illustrate a display of a level of trust indicator in accordance with the present invention.
Figure 4B:
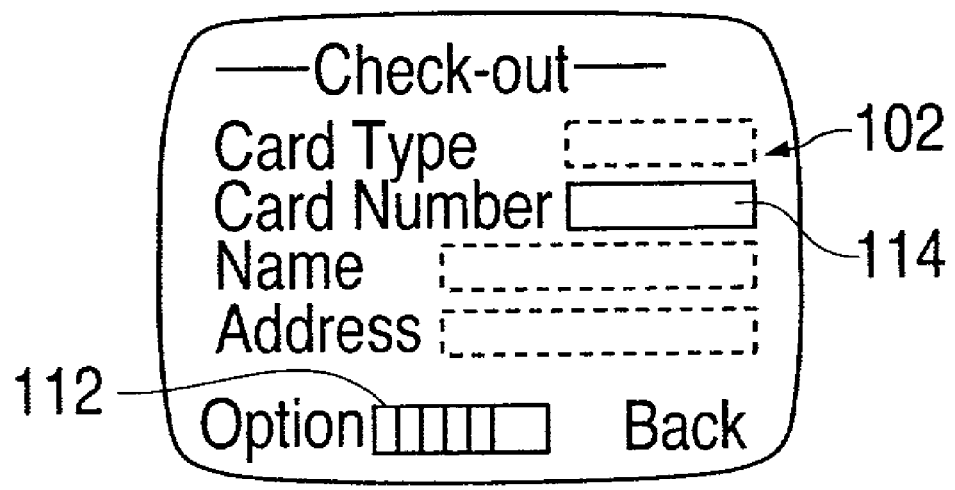

FIGS. 4A and 4B illustrate a display on a terminal device of a level of trust in accordance with the present invention. The level of trust is relative to a standard of comparison so that the display of the level of trust in association with communication operation(s) prior to transmission thereof to a network informs the user of a level of security determined to be associated therewith relative to other communication operations. The display of the level of trust enables the user to choose whether a communication operation is transmitted to the network after the user has considered the potential level of risk of transmitting secret, confidential or business sensitive information with the communication operation. The network to which communication operations are transmitted is part of the system of FIG. 5 as described below. The displays 100 and 102 may be produced by the LCD 3 of the prior art terminal of FIG. 1 or may be produced by a display of a terminal device, such as a PC. As illustrated, the display is physically similar to that produced by the prior art mobile terminal of FIG. 1 but the invention is not limited thereto.

The displays 100 and 102 respectively represent the first and second communication operations of a terminal session. With the invention, prior to actually communicating with the network with a communication operation a display 104, which may be graphical as illustrated, numerical, textual or any combination thereof, is produced on each of the displays 100 and 102 associated with the different communication operations. When the terminal session proceeds to the first operation, the block 110 in FIG. 4A, which is identified by the text "Card Type", is highlighted with a field contained within a rectangular window as illustrated. The highlighting of the "Card Type" tells the user that the first communication of the terminal session is active and if the displayed level of trust is acceptable, the user should input the user's "Card Type".

Figure 2:
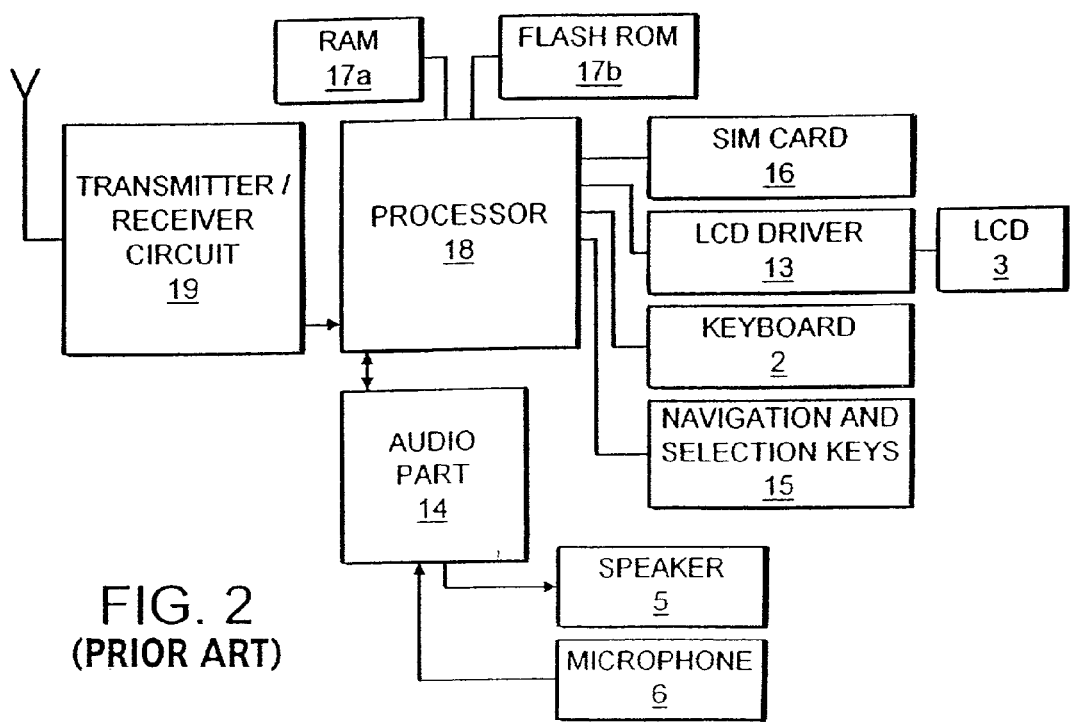
FIG. 2 illustrates a block diagram of the electronics of the prior art mobile terminal of FIG. 1.

When the terminal session proceeds to the first communication operation 110 requesting the user to input the "Card Type", a communication is sent either to the network, as described below, to a trust evaluation server therein or the terminal determines the level of trust or a combination of the trust evaluation server and the terminal is used. Based upon information stored within the RAM 17A of a prior art mobile terminal or other memory, such as RAM in a PC, determination of a level of trust to be associated with the first communication operation is performed before the first communication operation is permitted by the user to be transmitted to the network. As indicated, the display 104 of FIG. 4A shows two bars 112 indicating an intermediate level of security has been determined to be associated with the initial communication operation by either the processor 18 of the mobile terminal of FIGS. 1 and 2 executing programming therein or alternatively, the trust evaluation server, as described below in association with FIG. 5, or a distribution of the determination of the level of trust between the processor of the mobile terminal and the trust evaluation server of the network. The display of two bars 112 tells the user that there is an intermediate level of security associated with the transmission of the "Card Type" to the network, e.g. the identification of the bank card or travel and entertainment card issuer.

In FIG. 4B field 114 associated with the second communication operation card number is highlighted indicating that the second communication operation of the session is active. At the time of entry of the second communication operation of the terminal session, the more sensitive information of the "Card Number" is to be transmitted to the network. The level of trust of the second communication is determined in the same manner as the first communication operation. The determined level of trust is displayed as three bars 112 indicating that there is a higher level of security associated with the second communication operation.

"Name" and "Address" communication operations are processed in a similar manner. If the user proceeds through the third and fourth communication operations associated with "Name" and "Address" of FIGS. 4A and 4B, each communication operation of the session will, before transmission to the network, have a displayed level of trust.

Moreover, it should be understood that the session as displayed in FIGS. 4A and 4B, is only exemplary of the present invention. The invention is equally applicable to sessions involving different numbers and types of communication operations. Furthermore, while the displayed session is commercial in nature and is associated with the purchase of goods or services, sessions in accordance with the present invention have diverse applications.

Figure 4C:
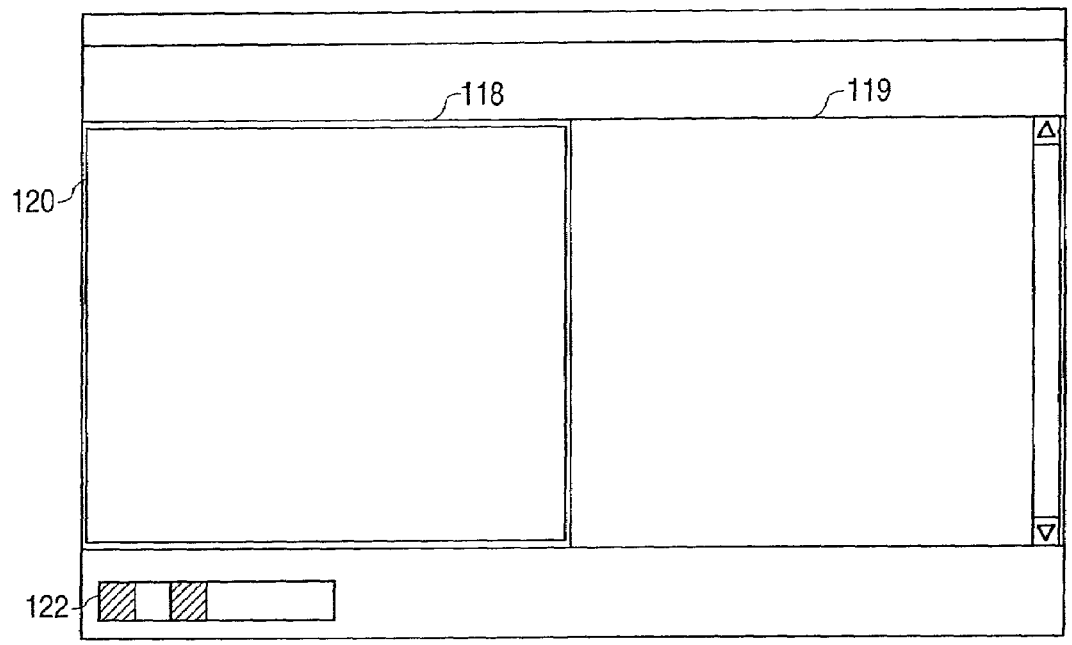
Figure 4D:
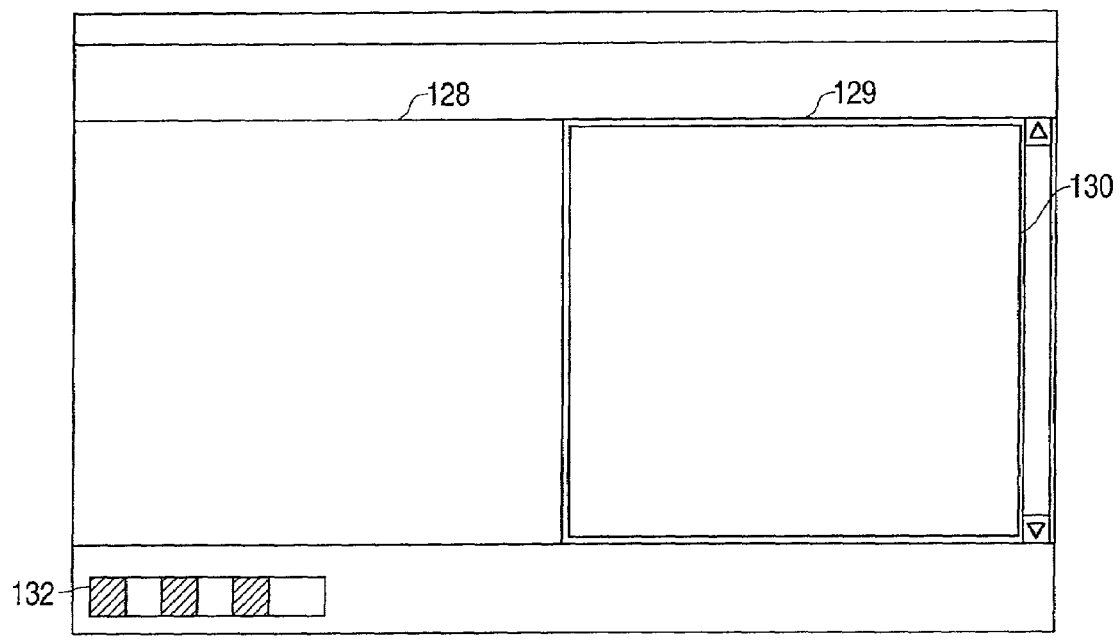
Figure 4E:
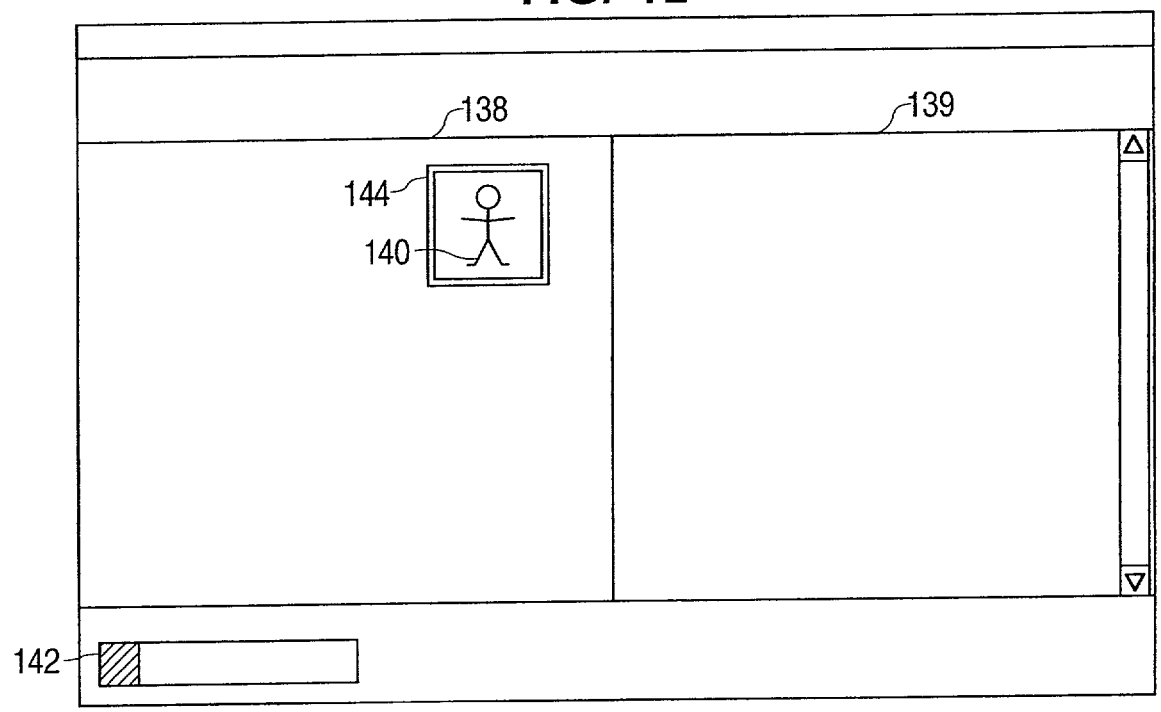

The benefit of the displayed level of trust to the user is several fold. First, the display of an indicated level of trust having at least one bar informs the user that there is some level of security associated with the communication operation which provides a limited degree of assurance that security is in place. Furthermore, based upon the user's level of experience of what he or she considers to be sensitive, the display provides a quantification of the level of security either numerically or graphically (numerical quantification has not been illustrated) permitting the user to evaluate the true level of trust associated with each part of the session with a common frame of reference as illustrated in FIGS. 4C–4E. In FIG. 4C, the leftmost section area 120 of the middle area (half of the display width) display is the selected frame of the two available frames 118 and 119. The selected frame 118 is indicated to be the selected one with a square frame 120. The determined level of trust is displayed as two bars 122. In FIG. 4D, the rightmost section area 130 in the middle area of the display is the selected frame of the two available frames 128 and 129. The selected frame 129 is indicated to be selected with a square frame 130. The determined level of trust is displayed as three bars 132. In FIG. 4E, the user display includes two frame areas 138 and 139 in the middle of the display. In the leftmost frame area 138 there is a section which is a so-called JAVA applet 140. The applet area 140 is now selected with selection frame 144. The level of trust of the applet 144 is displayed as one bar 142. The consideration of at least one and preferably all communication operations of a session permits the session to be stopped if the user determines that the displayed level of trust is unacceptably low with regard to what the user considers to be important with respect to the release of the requested information to the network.

The displayed level of trust is relative to a standard of comparison. Communication operations during a session will be evaluated relative to the same standard. The synthetic displayed level of trust, whether graphical, numerical text or some combination thereof or text, tells the user how the security of the particular communications operation compares with respect to other communication operations. The displayed level of trust indicator, which is determined as described below taking into account both technical and non-technical attributes of the session, enables the user to place on each communication operation a level of trust by being able to visually see the level of trust prior to transmission of each communication operation to the network.

There are two preferred methodologies for determining the displayed level of trust. The first methodology is to store in the memory of the processor associated with the terminal device the determination algorithm of the level of trust which may be if the terminal device is mobile, the RAM 17A associated with the processor 18 of FIGS. 1 and 2 or into the memory of a PC if the terminal device is connected via a wireline to the network. The stored information contained in the memory of the terminal device is used to analyze at least the technical attributes preferably of each of the communication operations of the current session to determine the level of trust to be displayed. One basis for doing this is to compare the technology utilized by the terminal device and network associated with the session to the current state of the art of terminal and network technologies stored in memory, including being periodically downloaded to update the memory with current technologies. For example, if the user were about to store transaction details in the terminal, the user may be presented with options of storing in the terminal memory or in the SIM module in FIG. 1. In view of SIM representing a current state of the art secure storage while RAM does not, the level of trust for storage in SIM will be displayed as higher. Additionally, if a user is to make an encrypted connection as part of a communication operation to a remote server in the network, the terminal device will cause the display of a higher level of security in view of the communication operation being identified by the terminal as being encrypted which is understood as a higher level of security.

The foregoing examples of technological attributes of the mobile terminal are only exemplary of other attributes of the technology which may be stored as representing the state of the art. The stored information, including the algorithm, represents the framework for comparison to generate the display of the level of trust.

Determination of the level of trust by the terminal has some disadvantages. To the extent that the material stored in the memory of the terminal device is not continually updated from the network, the effects of technological change and real life relationships may alter the significance of a displayed level of trust over time. As technology progresses, SIM may be cracked and may no longer represent the best solution for local secure storage. Nevertheless, unless the information stored in the memory of the terminal is updated regarding SIM, the user is given a display of a higher level of trust than that actually present in the future when SIM may become a less secure manner for storing information securely at the terminal in comparison to possible newer technologies. Furthermore, the real life information which exists about a session with a particular server may be inconsistent with the displayed level of security, such as when the terminal determines that a secure authenticated connection has been made but, in fact such a connection turns out to be in a totally non-secure environment. Of course factors such as the above, while being possible, are relatively unlikely. The information provided by the display of the level of trust in accordance with the invention is finer grained than the prior art which does not provide such information. To a large extent even with the possibility of error, the level of trust will be much more reliable even when the memory of the terminal is not updated to reflect weighing these circumstances into the determination of the level of trust.

The displayed level of trust indicator 104, whether graphical, numerical or otherwise, such as with a textual message or a combination thereof, is generated in the same manner that other communications on display devices for terminals are generated. For an internet browser, the indicator 104 could be placed on the status bar.

FIG. 5 illustrates a system 200 in which the present invention may be practiced. This system comprises a terminal 202, which may be a mobile terminal in accordance with the prior art of FIGS. 1 and 2, or a fixed terminal which may be a PC as well known, and a network 204. The terminal 202 has a display 206 which displays the aforementioned screens of FIGS. 4A–4E and other displays for providing the user with information about the terminal session and specifically, at least the level of trust indicator 124 or equivalent. The terminal 202 is connected by a communications link 208, which may be wireless or wireline, to a trust evaluation server 210. The level of trust may be determined also by a server in the network 204, such as the trust evaluation server 210 or through the combined operations of the processor(s) in the terminal 202 and in the trust evaluation server.

The network 204 includes a plurality of application servers 212 which are well known and are representative of any information source to which the terminal 202 is connected during a session of communication operations. Connectivity between the mobile terminal 202 and each of the application servers 212 may be through any type of network, including a packet data network 214 such as, but not limited to, the internet. Application servers 212 are typically controlled by organizations. The identity of the organizations is one of the attributes which may be taken into consideration during the determination of the level of trust determined solely by the processor of the terminal 202, solely by the processor of the trust evaluation server 210 or a combination thereof where each processor shares part of the task of determination of the level of trust. Additionally, the trust evaluation server 210 is connected to additional servers which are without limitation technology watchdog server 218, certificate issuer server 220 and market analysis server 222, which each provide an analysis of different attributes which are weighed and/or considered in determining the level of trust by the trust evaluation server 210.

The communication operation depicted in FIG. 5 is a "go and buy" communication operation 224. A series of processings occur in response to the "go and buy" communication operation 224 as follows. The initial entry of a "go and buy" communication operation 224, as highlighted or otherwise identified in the display, such as that described above in conjunction with FIGS. 4A–4E causes a communication 226 to be transmitted from the mobile terminal 202 to the trust evaluation server 210. At this point, the trust evaluation server 210 initiates an analysis which considers both technological attributes of the terminal session and non-technological attributes. The trust evaluation server 210 initiates a communication 228 to the technology watchdog server 218 which requests an evaluation of whether the to be utilized 128 bit encryption 230 contained in the "go and buy" operation 224 represents state of the art technology. The technology watchdog server 218, which contains a database which is updated to reflect the most current utilized technologies, including that involving encryption, etc., analyzes the 128 bit encryption 230 and sends a state of the art message 230 in a communication 232 back to the trust evaluation server 210. The trust evaluation server 210 then sends a communication 234 which requests the certificate issue server 220 to determine if the certificate "ABC" to be contained in the "go and buy" communication operation 224 is authentic. The certificate issuer server 220 determines that the certificate will expire in a week as indicated at message 237 and therefore is currently authentic. The trust evaluation server 210 then sends communication 238 indicating that the "go and buy" message is indicated in message 239 will be directed to company "XYZ" and will involve $200 U.S. Dollars. The market analysis server 222 sends a communication 240 back to the trust evaluation server 210 containing the message 241 that company "XYZ" has a bad reputation. At this time, the trust evaluation server 210 has considered technological information relative to the state of the art as provided by technology watchdog server 218 and non-technological information. Non-technological information to determine whether or not the certificate provided by the "go and buy" operation 224 is current is indicated by the certificate issuer server 220 and business analysis information regarding the company to which the transaction is directed is indicated by the market analysis server 222.

The combination of technological and non-technological information, which is only one possible subset of informations which may be utilized by the trust evaluation server 210 to determine the level of trust, is processed by the processor(s) within the trust evaluation server 210 in accordance with programmed criteria utilized to generate in part or totally the level of trust to be displayed by the display 206 of the terminal 202. After performing the processing of all of the available attributes, both of a technological and non-technological nature gathered by the trust evaluation server 210, communication 242 is transmitted by the trust evaluation server 210 back to the terminal device 202. As illustrated at 244, the communication 242 includes the message 244 that the "go and buy" operation 224 will be handled with acceptable technology but that the company to which the transaction is directed has a questionable operation with the resultant level of trust being 70% with the level of trust to be displayed being 70%, the technological component of the transaction utilized in the network 204 is acceptable, but the user of the terminal device 202 should be careful because inferentially the company to which the transaction will be directed has a bad reputation. Of course, if the certificate 235 was invalid, the indication in communication 242 would be that the "go and buy" communication operation should not be initiated because the application server 212 of company XYZ (not illustrated) is not associated with a certificate issued by a trusted third party which is extremely important to inform the user of the terminal device 202 that the user is not dealing with an authenticated server associated with company XYZ.

FIG. 6 illustrates a flowchart of one possible operation of the trust evaluation server 210 in analyzing communication operations to determine the level of trust thereof to be displayed by the display 206 of the terminal 202. Processing of the trust evaluation server 210 starts at point 300 where the communication operation to be evaluated is a message received from the terminal 202 at trust evaluation server 210. Processing proceeds to point 302 where the received message extracts the operation which is to be evaluated for purposes of displaying a level of trust, e.g. the "Card Type" or "Card Number" communication operations 110 and 114 of FIGS. 4A–4E. Processing proceeds to point 304 where a determination is made of whether the "Identity" and "Model" of the terminal 202 is listed in the message. If the answer is "yes", processing proceeds to point 306 where information about the technology used by the terminal is extracted. Processing proceeds to point 308 from either point 304 or point 306 where a determination is made of the required technology attributes of the network 204 utilized for the communication operation. Processing proceeds to point 310 where a determination is made if all attributes of the information in the message received from the terminal have been evaluated. If the answer is "no" at point 310, processing proceeds to point 312 to evaluate the next attribute of the message provided by the terminal which repeats until all attributes have been evaluated. If the answer is "yes" at point 310, processing proceeds directly to point 314 where a default value is assigned for any missing attribute utilized as part of the criteria for determining the level of trust.

The default values are chosen to represent an average contribution of each missing attribute so as to not erroneously lower the calculated level of trust to the minimum. Once an attribute is determined to be part of the processing used for determining a level of security, the default value mechanism is utilized to permit a level of trust to be calculated in the absence of numerical values or otherwise being provided for each of the attributes. It is better to assume, in the absence of any information, that the attribute has an average value than no value at all.

Processing proceeds to point 316 after all of the attributes have values associated therewith to calculate the final evaluation of the level of trust which is typically numerical but is not limited thereto to be displayed by the terminal device 202 if the trust evaluation server 210 is the sole source of the displayed level of trust. Processing finally proceeds to point 318 which represents communication 242 back to the terminal 202.

It should be understood that the foregoing processing performed by the trust evaluation server 210 is merely exemplary. Modification of the processing may be made to include different sequences of processing including not calculating the level of trust in the circumstance when the processing overhead is shared by the processor(s) within the trust evaluation server and the processor(s) within the terminal device 202.

The trust evaluation server 210 is usually a different entity than the application servers 212 which provide the user of the terminal 210 with applications which are accessed during the session. While it is possible that the trust evaluation server 210 and the application servers 212 to be one server, it is more likely that the illustrated architecture of a trust evaluation server 210 and application servers 212 will be utilized.

The trust evaluation server 210 may implement any trust assessment methodology for calculating completely or partially the level of trust so long as it is compatible with the operation of the terminal 202. It may be assumed that the trust evaluation server 210 at least takes into account the technological attributes of the communication operation which are context specific to the communication operation with other information as explained above also being used.

Many attributes of the technology utilized by both the terminal 202 and the trust evaluation server 210 may be taken into consideration. These technology attributes include encryption, session initiation, local storage and identification.

The overall trust evaluation may be performed solely by the terminal 202, solely by trust evaluation server 210, or a combination thereof. The technology attributes assess the fitness of the technology to the overall intended operation. What is acceptable for some communication operations as being secure may not be secure enough for other communication operations for the user to permit the communication operation to be performed by the network.

A listing of the relative security of encryption technologies from the most secure to the insecure may be as follows: operation within the terminal, 3 Data Encryption Standard (3DES), RC5 128 bit, RC5 56 bit (RC5 128 bit and RC5 56 bit being forms of RAS encryption) and no encryption.

A relative listing of session initiation technologies from the most secure to the least secure may be as follows: operation within terminal, server authenticated digital certificates (certificate must be evaluated to make sure it is valid), server authenticated shared secret, server authenticated, network address and anonymous.

A relative listing of local storage technologies from the most secure to the least secure are as follows: tamper-proof, hardware-based software encryption, no encryption, plain memory.

A relative listing of identification technologies from the most secure to the least secure may be as follows: biometrics, fingerprint, eye iris image, etc., personal identification number (PIN) and none.

It should be understood that encryption, session initiation, local storage and identification are not inclusive of all possible technological attributes of the terminal 202 and the network 204 which may be evaluated in the determination of the level of trust. Furthermore, the above-referenced relative listings of the most secure technologies to the least secure technologies are subject to change and augmentation depending upon new candidate technologies being available.

Furthermore, the relative weighting of different attributes based upon technological and non-technological consideration, e.g. information from the technological watchdog server 218 versus information from the market analysis server 210 is subject to different implementations which will result in different levels of trust depending upon how different attributes are weighed within the determination and/or calculation of the level of trust. Different methodologies for calculating the level of trust and the weighting of attributes therein are possible.

The display of the level of trust, regardless of how it is generated, represents information which is highly useful to the user of a terminal in a session of communication operations with one or more destination servers in a network. The user assesses whether communication operations within the session represent any undue risk for which it is desirable to terminate the session. Furthermore, display of the level of trust provides the user with a level of confidence that the overall session is not going to expose the user's information inputted during the session to an acceptable risk of disclosure.

Furthermore, while determination of the level of trust solely by the terminal 202 is simpler, it has less flexibility than the utilizing of the trust evaluation server 210. This difference is the result of more information being available through the trust evaluation server than is available through the processor(s) of the terminal device 202.

Non-technological attributes which may be weighed or considered in the trust evaluation server's determination of the level of trust include, but are not limited to, reliability of the operator of the server and commercial liability of any offer associated with the session. The non-technology attributes are reliability of the operator of the application server, commercial offering made by the operator of the application server or a source of the purchased goods or services.

Moreover, the order of the steps for determining the level of trust is immaterial as long as the final determination of the level of trust is not dependent upon the order.

As indicated above, the overall algorithm for determining the level of trust may be shared between the processor of the trust evaluation server 210 and the processor of the terminal 202. For example, the terminal 202 may request from the trust evaluation server 210 raw scores regarding aspects of technology being used as obtained from the technology watchdog server and the terminal 202 may evaluate other attributes and calculate the final level of trust by itself. On the other hand, the trust evaluation server 210 may perform all of the determination of the level of trust with the terminal 202 only displaying the final result as indicated by the flowchart of FIG. 6.

In a typical algorithm for determining the level of trust, there are several technology and non-technology attributes involved with not all attributes usually being present. Which attributes are present depends on an actual communication operation which is evaluated. If the terminal 202 does not send to the trust evaluation server all of the attributes that are required for the given communication operation, the trust evaluation server 210 still proceeds with calculating a level of trust using the aforementioned default values.

One way for the trust evaluation server 210 to perform the process illustrated in FIG. 6 is to compare data provided by the terminal with the weighting table. Examples are evaluating a security rating or by consulting additional servers, e.g. technology watchdog server 218, certificate issue server 220 and market analysis server 222.

The processing of FIG. 6 may be extended so that the trust evaluation server 210 receives the identity of the terminal (either in a form of an absolute identity, e.g. IME number or as a make/model information) and then uses the information stored within the server or at another site to extract the actual technology used by the terminal 202. In this circumstance, the terminal sends all the information about technology that has been updated since the original release (e.g. new security software) or about technology that is used in conjunction with the terminal, e.g. the actual use of a smart card.

Figure 7:
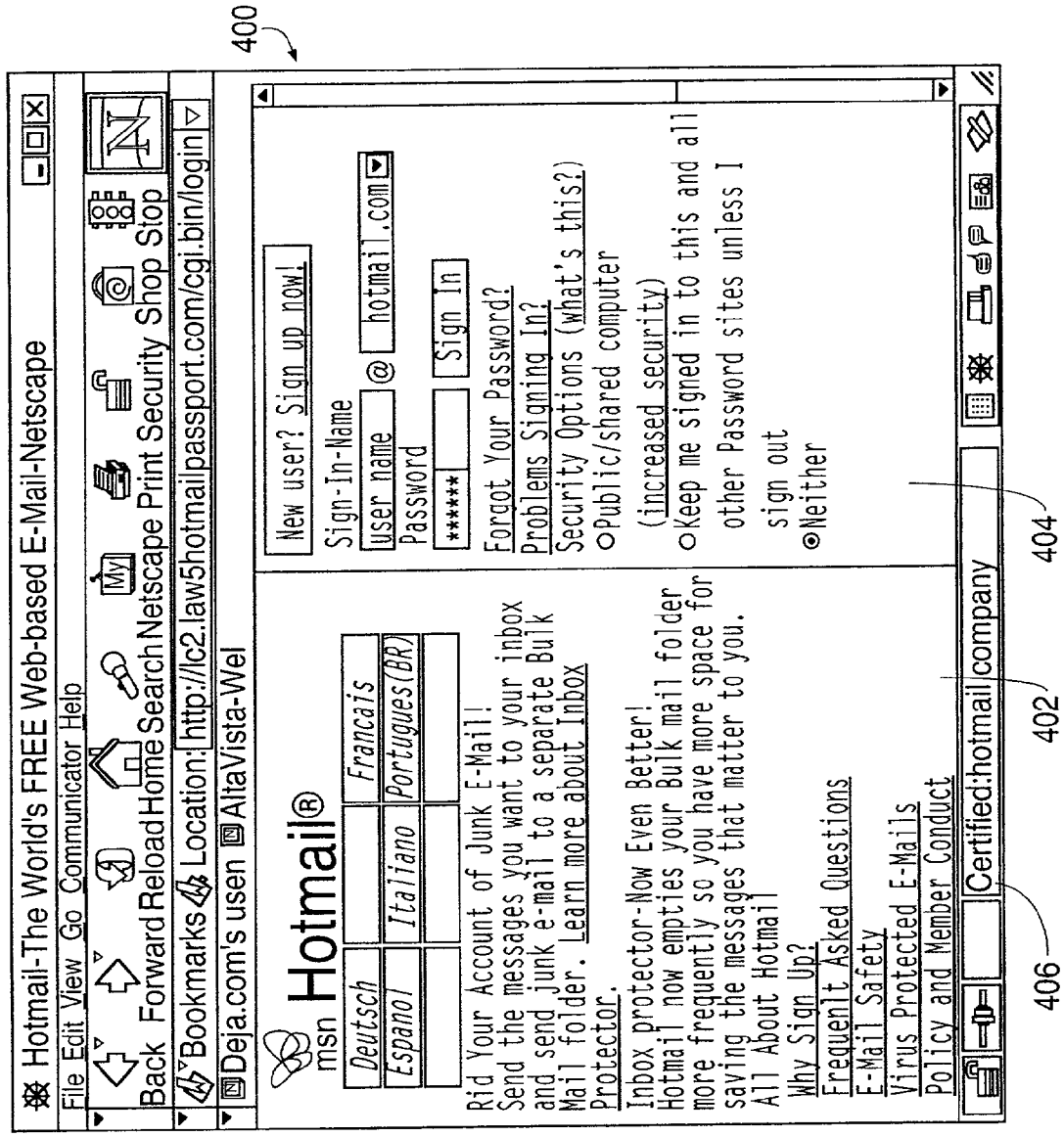
FIG. 7 illustrates a browser log on screen displayed in accordance with the present invention.

FIG. 7 illustrates another embodiment of the present invention which may be practiced in the system of FIG. 5. The trust evaluation server 210 transmits to terminal 202 a display 400 of pages as illustrated in FIG. 7 having multiple frames like the prior art of FIG. 3B. By example, only frames 402 and 404 are illustrated, but each page is not limited to the display of any set number of frames per page. The frames typically are from the application servers 212 in the network, but without limitation thereof. The trust evaluation server 210 transmits a series of page(s) 400, including a certification 406 indicating that the trust evaluation server 210 has collected information within the page 400 containing the multiple frames 402 and 404, which have been determined by the trust evaluation server 210 to be from secure sources. The "certified" message 406 informs the user of the terminal 202 that the sources of all of the frames 402 and 404 have come from a trusted source.

The trust evaluation server 210 transmits pages to the browser of the terminal 202 through network 214. The trust evaluation server has a certificate issued by a TTP along with a secret key providing the identity of the trust evaluation server 21. The certificate may be clicked "on" to reveal a verified identity of the trust evaluation server 210 or the organization responsible therefor. The certificate 406 further informs the user that all of the sources of the frames 402 and 404, e.g. application servers 210 are from a trusted source as described in detail in FIGS. 4C–4E.

Figure 3A:
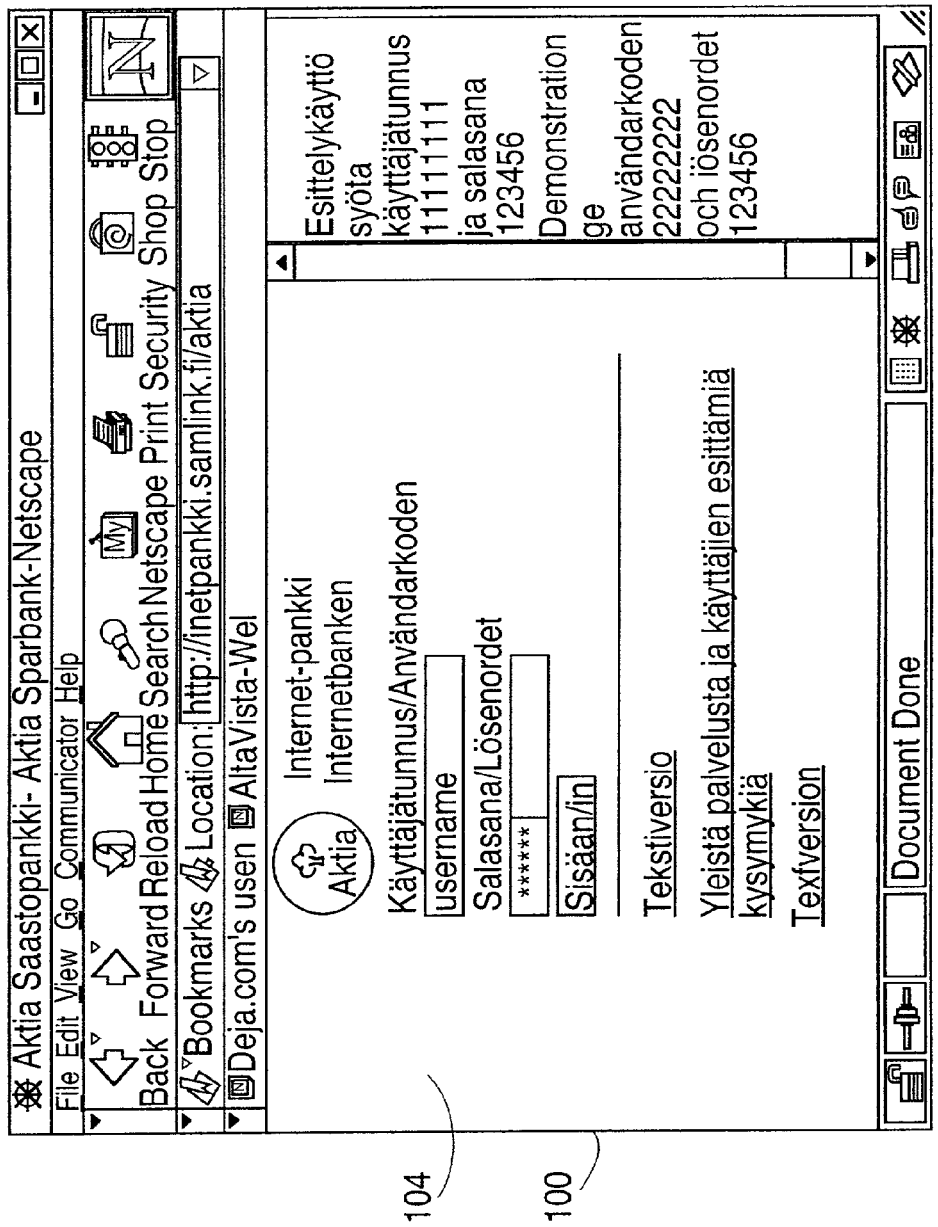
FIGS. 3A and 3B illustrate prior art browser log-on screens.
Figure 3B:
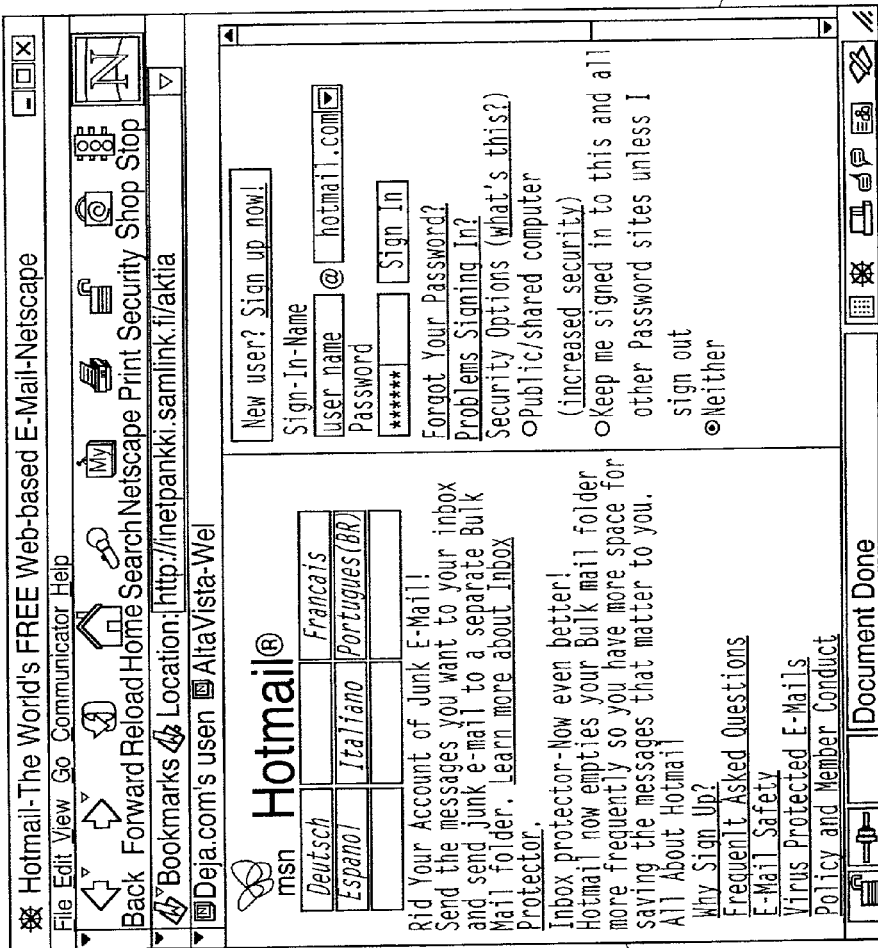

The message 406 overcomes the prior art problem of FIG. 3B wherein, with multiple frames, no indication is provided of whether the frames are from a secure source beyond the indication 102.

With the invention, the certification performed by the trust evaluation server 210 assures the user that all sources of the frames information in pages to which the browser is linked are secure which enables the user to proceed with confidence.

While the invention has been described in terms of its preferred embodiments, numerous modifications may be made thereto without departing from the spirit and scope of the present invention. It is intended that all such modifications fall within the scope of the appended claims.

What is claimed is:

1. A method comprising:
receiving, at a server operatively connected to a terminal through a network, a plurality of individual communication operations transmitted from a browser installed on the terminal;
determining, at the server, a level of trust for each of the plurality of individual communication operations received from the terminal;
providing information from the server to the browser relating to at least one communication operation; and
displaying on a display on the terminal a level of trust, informing a user of a level of security determined to be associated with the at least one communication operation upon a comparison of the at least one communication operation to a standard prior to transmission to the network, and wherein the terminal is configured to receive an input for accepting or rejecting the at least one communication operation based on the displayed level of trust.

2. A method in accordance with claim 1 wherein:
terminal is a mobile terminal; and
the at least one communication operation comprises wireless transmissions between the mobile terminal and an entity in the network.

3. A method in accordance with claim 1 comprising:
displaying a level of trust of each communication operation; and
wherein each level of trust is based at least in part upon technology in the network which is involved with each communication operation associated with the displayed level of trust.

4. A method in accordance with claim 2 wherein:
displaying a level of trust of each communication operation; and
wherein each level of trust is based at least in part upon technology in the network which is involved with each communication operation associated with the displayed level of trust.

5. A method in accordance with claim 1 wherein:
the server determines a level of trust of each communication operation based at least in part on technology of the network associated with the network providing each communication operation.

6. A method in accordance with claim 5 wherein:
level of trust is also at least in part dependent upon at least one additional attribute the network used in processing the communication operation.

7. A method in accordance with claim 6 wherein:
the at least one additional attribute is at least one of reliability of an operator of a server offering a service during the session through the browser to the user or commercial viability of an offer of service made to the user during the session through the browser.

8. A method in accordance with claim 2 wherein:
the server determines a level of trust of each communication operation based at least in part on technology of the network associated with the network providing each communication operation.

9. A method in accordance with claim 8 wherein:
level of trust is also at least in part dependent upon at least one additional attribute the network used in processing the communication operation.

10. A method in accordance with claim 9 wherein:
the at least one additional attribute is at least one of reliability of an operator of a server offering a service during the session through the browser to the user or commercial viability of an offer of service made to the user during the session through the browser.

11. A system in accordance with claim 1 wherein:
display of the level of trust is a graphic presentation.

12. A system in accordance with claim 1 wherein:
display of the level of trust is a numerical value.

13. A system comprising:
a terminal including a display;
a network comprises a server which determines a level of trust of each of a plurality of communication operations to which the terminal is coupled via a communication link; and wherein the terminal uses a browser to communicate with the network server during a terminal session comprising at least one communication operation from the browser is received at the server, the network, provides information from the network to the browser relating to the terminal session, and the display displays a level of trust providing a level of security determined to be associated with the at least one communication operation based upon a comparison of the at least one communication operation to a standard prior to transmission to the network; and the terminal comprises means for accepting or rejecting the at least one communication operation based upon comparison of the displayed level of trust.

14. A system in accordance with claim 13 wherein:
terminal is a mobile terminal; and
the at least one communication operation comprise wireless transmissions between the mobile terminal and an entity in the network.

15. A system in accordance with claim 13 wherein: a level of trust is displayed by the display of each communication operation; and
each level of trust is based at least in part upon technology in the network which is involved with each communication operation associated with the displayed level of trust.

16. A system in accordance with claim 14 wherein: a level of trust is displayed by the display of each communication operation; and
each level of trust is based at least in part upon technology in the network which is involved with each communication operation associated with the displayed level of trust.

17. A system in accordance with claim 13 wherein:
the server determines a level of trust of each communication operation based at least in part on technology of the network associated with the network providing each communication operation.

18. A system in accordance with claim 17 wherein:
the level of trust is also at least in part dependent upon at least one additional attribute of the communication operation which is not related to technology of the network used in processing each communication operation.

19. A system in accordance with claim 18 wherein:
the at least one additional attribute is at least one of reliability of an operator of a server offering a service during the session through the browser to the user or commercial viability of an offer of service made to the user during the session through the browser.

20. A system in accordance with claim 13 wherein:
the network comprises a server and the terminal comprises a processor, wherein the server provides information about processing of each communication operation by the network to the processor and the processor in response to the information determines the level of trust which is displayed by the display and the processor determines a level of trust of each communication operation based at least in part on technology of the network associated with the network providing each communication operation.

21. A system in accordance with claim 20 wherein:
the level of trust is also at least in part dependent upon at least one additional attribute each communication operation which is not dependent upon technology of the network associated with the network providing each communication operation.

22. A system in accordance with claim 21 wherein:
the at least one addition attribute is at least one of reliability of an operator of a server offering a service during the session through the browser to the user or commercial viability of an offer of service made to the user during the session through the browser.

23. A system in accordance with claim 13 wherein:
display of the level of trust is a graphic presentation.

24. A system in accordance with claim 13 wherein:
display of the level of trust is a numerical value.

* * * * *